Feb. 6, 1923.

J. H. DOWNIE.
METHOD OF FORMING CENTERS.
ORIGINAL FILED SEPT. 15, 1919.

1,444,172

Inventor
J. H. Downie
Attorney

Patented Feb. 6, 1923.

1,444,172

UNITED STATES PATENT OFFICE.

JAMES H. DOWNIE, OF SAN ANTONIO, TEXAS.

METHOD OF FORMING CENTERS.

Original application filed September 15, 1919, Serial No. 323,756. Divided and this application filed September 2, 1921. Serial No. 498,058.

*To all whom it may concern:*

Be it known that I, JAMES H. DOWNIE, a citizen of the United States, residing at San Antonio, in the county of Bexar, State of Texas, have invented certain new and useful Improvements in Methods of Forming Centers; and I do hereby declare the following to be a full, clear, and exact description of the invention, such as will enable others skilled in the art to which it appertains to make and use the same.

This invention relates to centering machines and is a division from my application for patent for improvements in center forming devices, filed Sept. 15, 1919, Ser. No. 323,756.

The object of the invention is to produce a machine by means of which the exact center in the end of a shaft or similar piece of rotating work can be found and turned so that the work can subsequently be put onto a lathe for turning.

In constructing a centering machine in accordance with the present invention, I provide a bed having a single pair of ways, instead of double as those of an ordinary turning lathe. At one end of the ways is a head stock, having a hollow spindle, on which is mounted a chuck to receive the work to be centered.

I mount on the ways a work support similar to the well known universal chuck, but which does not rotate, the jaws of the chuck being adjusted to hold the work only with such pressure as to prevent chattering, forming a bearing in which the end of the shaft to be centered rotates.

Upon the ways is mounted a carriage corresponding to the tail stock of a lathe and upon which is mounted a member that is adjustable transversely of the bed end which in turn carries a turret, the base of which is adjustable thereon longitudinally of the bed while the body of the turret is rotatably adjustable as is usual.

The turret is provided with three tools, of which the first one to be brought into action is a facing tool that faces the end of the work at right angles to its axis of rotation. The next tool is a grooving tool which when presented to the work, has its point eccentric to the axis of rotation of the work, so as to cut an annular groove concentric to the axis of rotation. The third tool is a stationary drill which is presented to the work with its axis alined with the axis of rotation of the work and which serves to cut out the material within the enclosure of the outer wall of the groove and which wall is, of course, concentric to the axis of rotation. The result is a conical bearing seat in the end of the work, the curved wall of which is concentric to the axis of rotation. The bearing seat thus provided is a true concentric seat whether or not the drill was presented concentric to the axis of rotation of the work.

Details of one manner of successfully carrying out this invention are set forth below, and reference is made to the drawings wherein.

Figure 1:
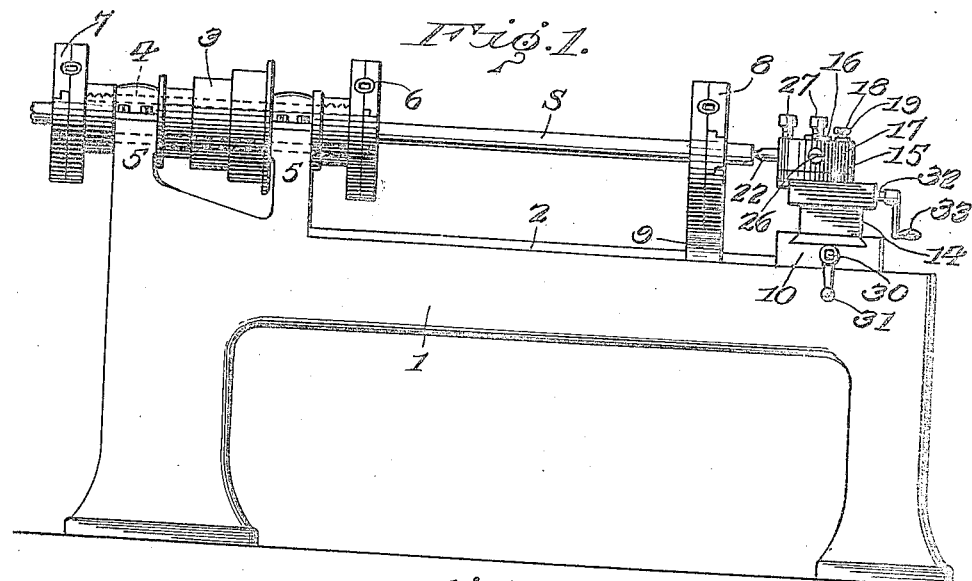
Figure 1 is a side elevation of this machine.

In the drawings, a machine is shown as having a bed 1 provided with ways 2, and power is communicated from a suitable source to the pulleys 3 fast on a tubular shaft 4 journaled in bearings 5 rising from said bed, the shaft carrying a chuck 6 by means of which the work is grasped and rotated. The work is here shown as a metal rod or shaft S and if longer than illustrated in Figure 1, it could be extended through the tubular driving shaft and held in the left hand chuck 7. On the ways is mounted the base of a turret whose parts are adjustable transversely and longitudinally of the bed in the usual or any well known manner, and this turret carries the tools.

I prefer to guide the free end of the work S by a second chuck numbered 8, which is a non-revolving, universal, three-jawed structure whose jaws are simultaneously moved as usual by a mechanism not necessary to show and describe in detail. The support 9 for this chuck holds it upon and above the ways 2 so that its true axis is in exact alinement with the true axis of the driving chuck 6. The jaws in the latter are adjusted to grip one end of the work S, whereas the jaws in the chuck 8 are adjusted to a point where they serve as a guide for the other end of the work.

The turret may be of any appropriate construction and is mounted upon the block 14 which in turn is mounted on the base 10 that is slidable longitudinally of the bed 1. The block 14 has the usual dove-tail connection with the base 10 for adjustment transversely thereof through the medium of the adjusting screw 30 that is operated by the crank 31. The turret has also a dove-tail connection with the upper face of the block 14 along which it is adjustable of the bed 1 through the medium of the usual adjusting screw 32 having an operating crank 33. These adjustments are well known to those skilled in the art and will not require specific illustration.

It is the base 15 of the turret that is slidably mounted in the block 14 and this base has a vertical cylindrical post 16 on which is rotatably mounted a head 17 carrying the tools that are herein described. The head of the turret is illustrated as cylindrical and it is held in its different angular adjustments by the usual spring bolt 18, the lower end of which engages the member 15 and the upper end of which bolt is provided with a knob 19 to facilitate raising of the bolt from the member 15 to permit of angular adjustment of the turret head.

Figure 2:
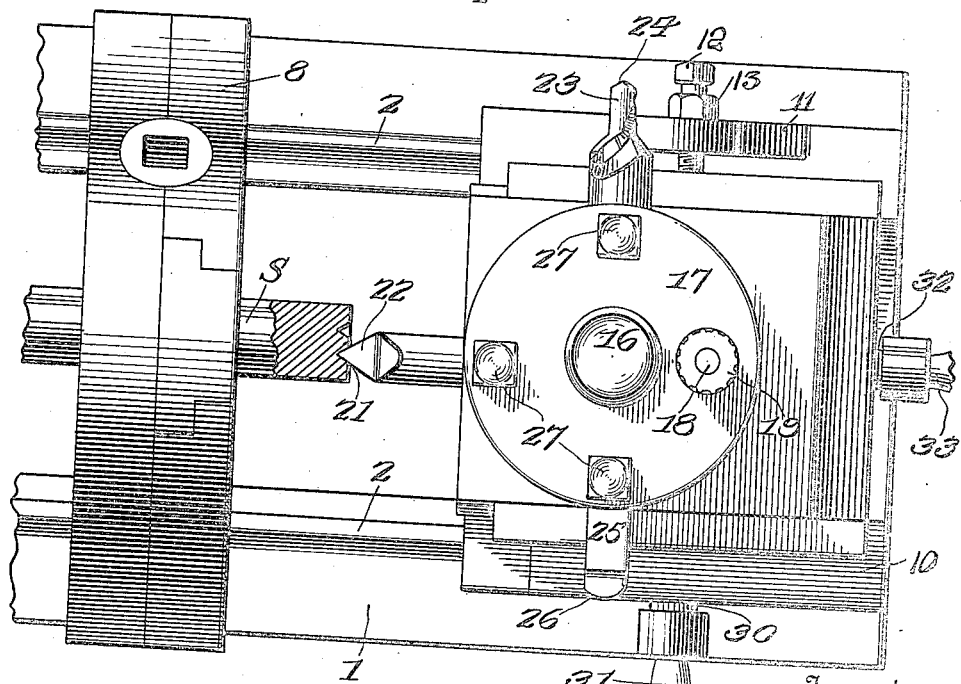
Figure 2 is a plan view of the right end of Figure 1, on a larger scale, showing the free end of the work in section.

Mounted in and standing radial to the head 17 are three tools, one numbered 21 being the turning tool and having a V-shaped point 22, another number 23 being the finishing tool and having a rather blunt drill point 24, and a third being the facing tool 25 with a rounded point 26. These several tools may be mounted in the head in any suitable way, but are preferably held under set screws 27 as usual, and the facing tools are shown as diametrically opposite and standing on a strictly radial line through the center of the head, while the roughing tool 21 is shown as disposed between the other two and a little off a strict radial line which would pass from the center of the post 16 along the true axis of the work S as clearly seen in Figure 2. It will be understood that the element 15 is provided with sockets for the tip of the bolt 18 which are so located that the tool selected may be caused to project toward the work, which is to the left in both views.

From the base 10 rises a lip or flange 11 through which is screwed a stop screw 12 provided with a jam nut 13 for holding it at times against rotation, the free end of the screw being directed toward the block 14 so that it may be positioned to limit movement of the block with the turret transversely of the bed 1, to position with either of the tools 23 and 25 centered with the work when the turret is correspondingly adjusted.

In the use of the machine, a piece of work which in the present instance is shown as a shaft S, is engaged at one end in the chuck 6 and is passed between the jaws of the positioning chuck 8, the jaws of which are then adjusted so as to hold the shaft against chattering but to permit of its rotation. The turret is then turned to bring the facing tool 25 with its axis parallel to the axis of rotation of the work and by manipulation of the screw 32 through the medium of its handle 33, the turret is shifted to bring the facing tool up to the work. Then, through the medium of the screw 30 and its handle 31, the block 14 with the turret is fed transversely of the bed 1 to carry the facing tool across the end of the shaft so as to give it a flat face to facilitate such treatment by the tool 21. The turret is then shifted to the position shown in Figure 2 and is advanced to engage the point 22 of the tool 21 with the end face of the shaft at a point eccentric to the axis of rotation of the shaft. The point 22 being tapered, it cuts an annular groove in the end face of the shaft, illustrated in Figure 2, which groove is, of course, concentric with the axis of rotation of the shaft and which axis of rotation is approximately central to the periphery of the shaft by reason of the positioning chuck 8. This annular groove that the tool 21 cuts, has both its inner and outer walls tapered and when the tool becomes initially active, there is within the enclosure of the groove a resultant frusto-conical boss, which becomes first conical and then diminishes in altitude and base diameter as the tool advances. When the groove has been cut to the proper depth, at which time the altitude of the conical boss is materially less than the depth of the groove, the tool is withdrawn, and the turret is rotated to direct the drill 23 toward the work and with its axis parallel thereto. By manipulation of the screw 30 through the medium of its handle 31, the block 14 is then fed transversely of the bed 1 until it contacts with the screw 12, which as above stated, is adjusted so that under such condition, the drill 23 will be centered with the work or in other words will be in axial alinement therewith. Thus, this transverse adjustment may be accomplished without the exercise of special care as the screw 12 will terminate the transverse adjustment with the drill in axial alinement with the work.

The axis of the drill intersects the axis of rotation of the turret and the drill engages the central boss and cuts it entirely away, the diameter of the drill being greater than the base diameter of the conical boss that has been left. The drill is then withdrawn and the result is a socket in the end of the work, every section through the wall of which socket in planes perpendicular to the axis of rotation of the work, is either a complete and true circle if the drill was axially alined with the work or is in the arc of a true circle if the axis of the drill was parallel to but at one side of the axis of the work. It is of course understood that if the axis of the drill 23 has not been absolutely alined with the work and its annular groove, the inner end of the tapered socket is not in a plane at right angles to the axis of the socket, but on the contrary, is at a slight angle thereto. These complete circles or arcs, as the case may be, being of constantly decreasing radii inwardly of the socket, it will be understood that a bearing will be presented for the dead center of the lathe, which is shaped to correspond to the angularity of the wall of the socket.

What is claimed is:

The method of centering a piece of work for subsequent turning which consists in rotating the work about an axis passing through it, presenting a grooving tool to an end face of the work eccentric to its axis of rotation with the cutting of an annular groove, and removing the material within the enclosure bounded by the groove to a plane materially inwardly of the outer edge of the outer wall of the groove.

In testimony whereof, I affix my signature.

JAMES H. DOWNIE.